United States Patent [19]
Roberts

[11] Patent Number: 5,732,887
[45] Date of Patent: Mar. 31, 1998

[54] DRIP IRRIGATION TAPE AND METHOD OF MANUFACTURE

[76] Inventor: James C. Roberts, 2822 Pasatiempo Glen, Escondido, Calif. 92025

[21] Appl. No.: 383,885

[22] Filed: Feb. 6, 1995

Related U.S. Application Data

[63] Continuation-in-part of Ser. No. 194,854, Feb. 14, 1994, Pat. No. 5,387,307, Continuation of Ser. No. 15,080, Feb. 8, 1993, Pat. No. 5,318,657, Continuation of Ser. No. 722,535, Jun. 27, 1991, abandoned, Division of Ser. No. 485,778, Feb. 22, 1990, abandoned, Continuation of Ser. No. 332,588, Apr. 3, 1989, abandoned, Continuation-in-part of Ser. No. 156,413, Feb. 16, 1988, abandoned.

[51] Int. Cl.$^6$ ............... A01G 25/02; B05B 15/00
[52] U.S. Cl. ............................................. 239/542
[58] Field of Search ................................... 239/542

[56] References Cited

U.S. PATENT DOCUMENTS

| | | | |
|---|---|---|---|
| 2,484,195 | 12/1949 | Gilead | 239/542 |
| 3,870,236 | 3/1975 | Sahagun-Barragan | 239/542 |
| 4,173,309 | 11/1979 | Drori | 239/542 |
| 4,177,946 | 12/1979 | Sahagun-Barragan | 239/533.1 |
| 4,247,051 | 1/1981 | Allport | 239/542 |
| 4,285,472 | 8/1981 | Okada et al. | 239/542 |
| 4,354,639 | 10/1982 | Delmer | 239/542 |
| 4,413,787 | 11/1983 | Gilead et al. | 239/542 |
| 4,460,129 | 7/1984 | Olson | 239/542 |
| 4,473,191 | 9/1984 | Chapin | 239/542 |
| 4,534,515 | 8/1985 | Chapin | 239/542 |
| 4,548,360 | 10/1985 | Delmar et al. | 239/542 |
| 4,655,397 | 4/1987 | Gorney | 239/542 |
| 4,807,668 | 2/1989 | Roberts | 138/103 |
| 4,984,739 | 1/1991 | Allport | 239/542 |
| 5,111,995 | 5/1992 | Dumitrascu et al. | 239/542 |
| 5,118,042 | 6/1992 | Delmer | 239/542 |
| 5,123,984 | 6/1992 | Allport et al. | 156/203 |
| 5,246,171 | 9/1993 | Roberts | 239/542 |
| 5,282,578 | 2/1994 | De Frank | 239/542 |
| 5,318,657 | 6/1994 | Roberts | 156/466 |
| 5,375,770 | 12/1994 | Roberts | 239/533.13 |
| 5,387,307 | 2/1995 | Roberts | 156/466 |

FOREIGN PATENT DOCUMENTS

| | | | |
|---|---|---|---|
| 69487 | 1/1983 | European Pat. Off. | 239/542 |
| 196763 | 10/1986 | European Pat. Off. | 239/542 |
| 2726358 | 6/1976 | Germany | 239/542 |
| WO8500003 | 1/1985 | WIPO . | |
| WO9221228 | 12/1992 | WIPO . | |

*Primary Examiner*—Kevin Weldon
*Attorney, Agent, or Firm*—Brown, Martin, Haller & McClain

[57] ABSTRACT

A drip irrigation hose is formed from an elongated flat strip of flexible material. One side edge portion of the strip is deformed to form a series of indented channel formations deformed out of the plane of the strip, and the strip is then folded with the deformed side edge portion outermost and the channel formations facing inwardly and overlapping the underlying opposite side edge portion of the strip. The opposite side edge portions are sealed together to form a main conduit within the strip and a series of secondary conduits along the channel formations. Each channel formation has a series of spaced inlet channels extending transversely across the innermost side edge of the strip and into the secondary conduit.

27 Claims, 3 Drawing Sheets

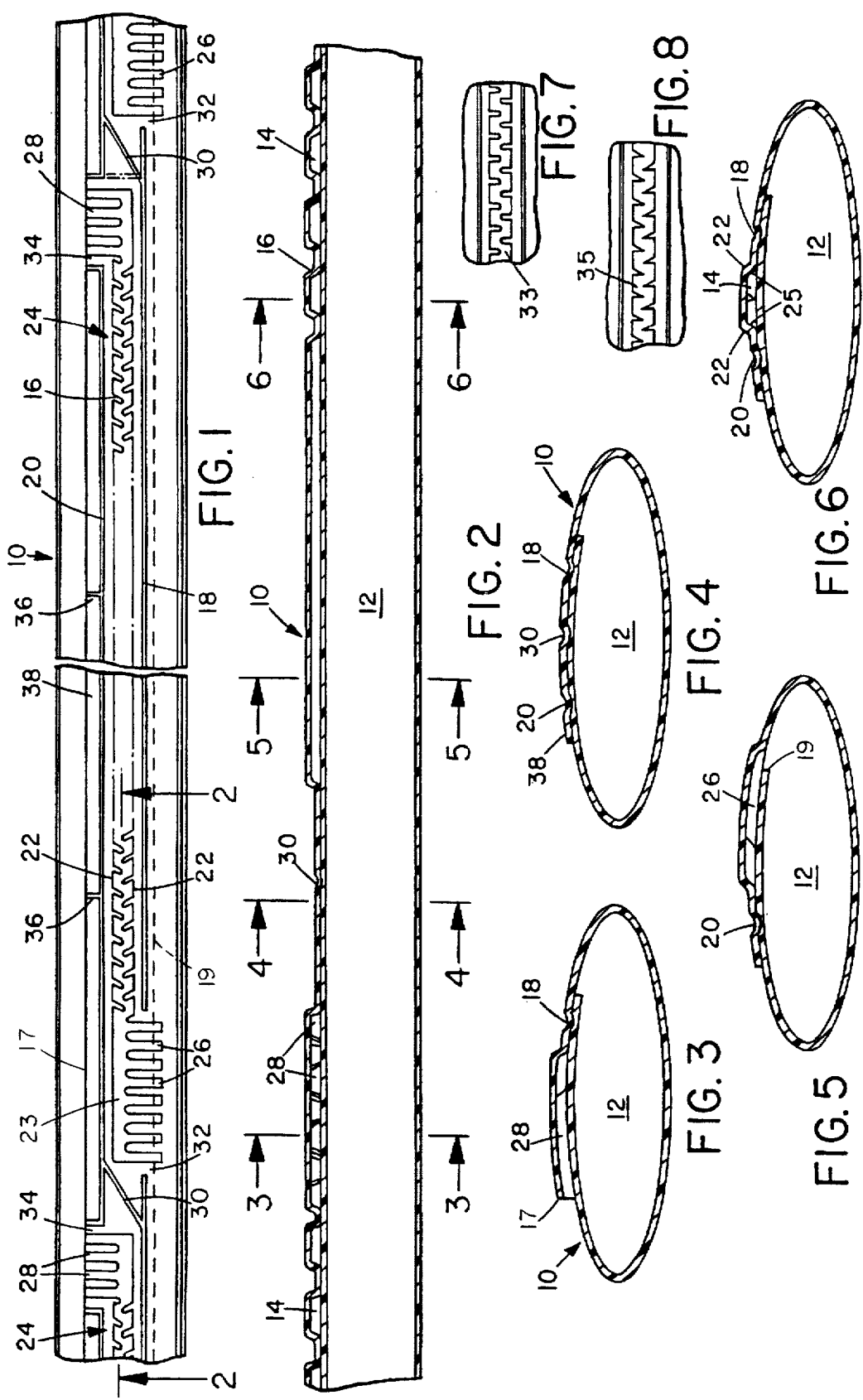

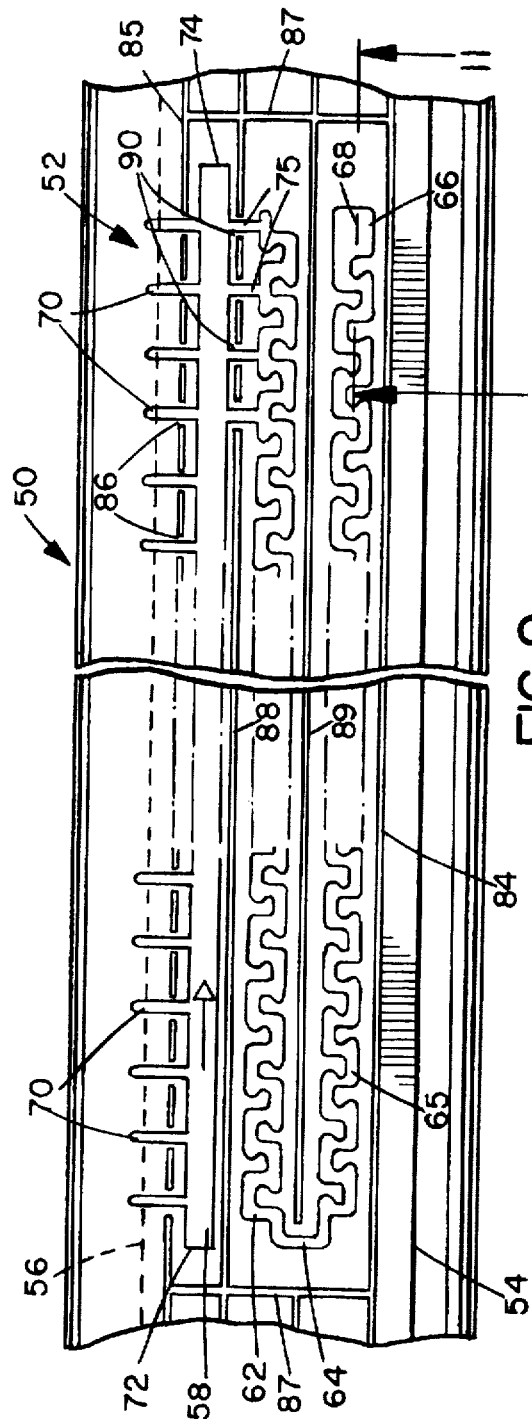
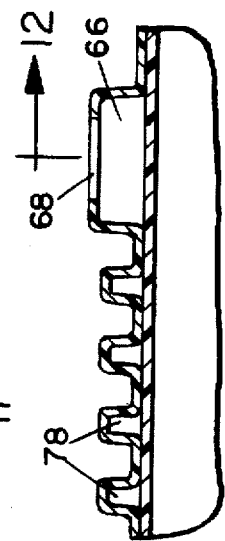
FIG. 11
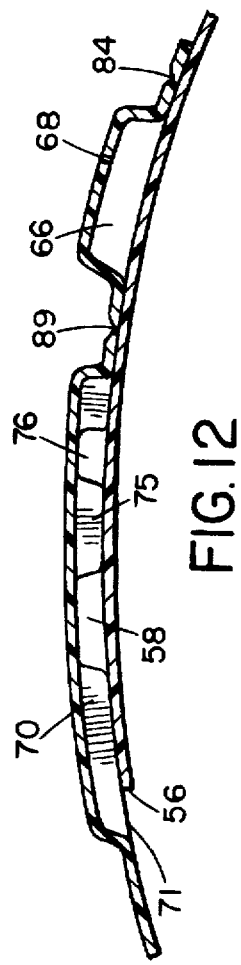
FIG. 12
FIG. 9
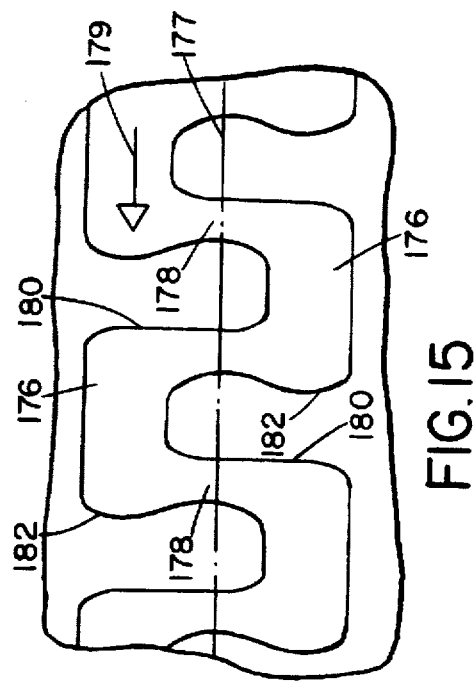
FIG. 15

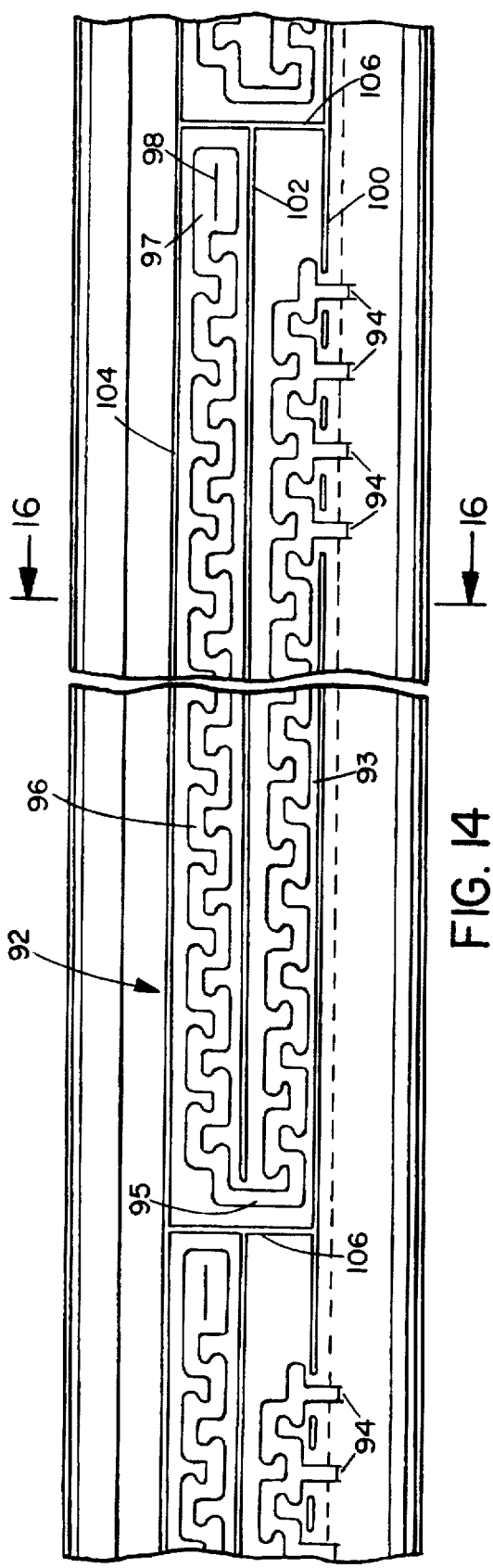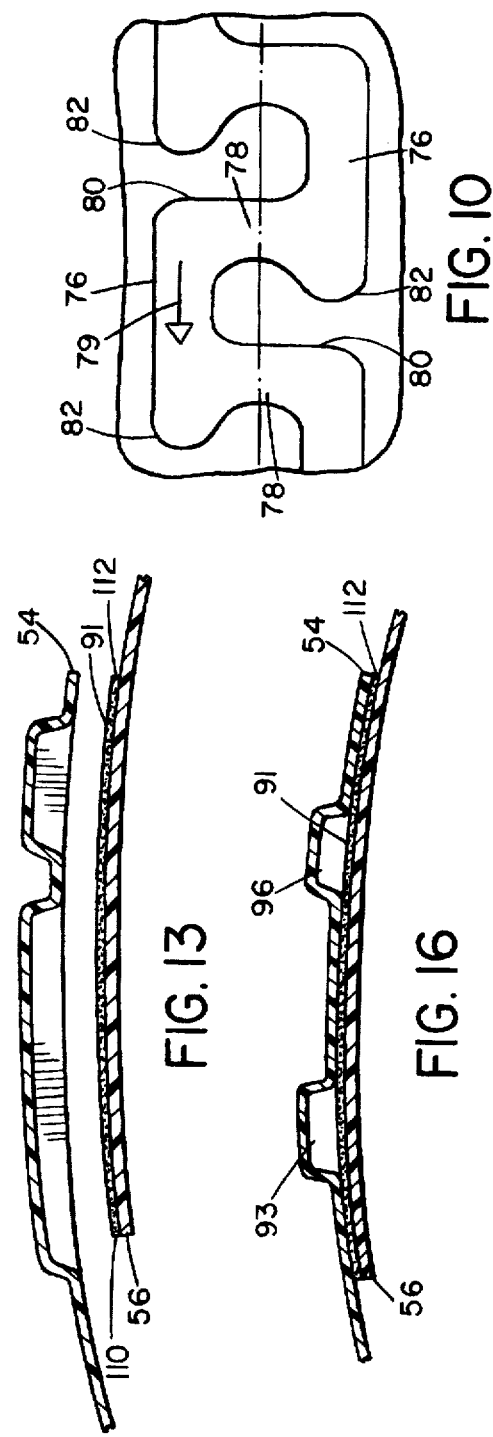

5,732,887

DRIP IRRIGATION TAPE AND METHOD OF MANUFACTURE

CROSS-REFERENCES TO RELATED APPLICATIONS

This application is a Continuation-In-Part of application Ser. No. 08/194,854 filed Feb. 14, 1994, now U.S. Pat. No. 5,387,307 which was a Continuation of application Ser. No. 08/015,080 filed Feb. 8, 1993 now U.S. Pat. No. 5,318,657, which was a Continuation of application Ser. No. 07/722, 535 filed Jun. 27, 1991 (abandoned), which was a divisional of application Ser. No. 07/485,778 filed Feb. 22, 1990 (abandoned), which was a Continuation of application Ser. No. 07/332,588 filed Apr. 3, 1989 (abandoned), which was a Continuation-In-Part of application Ser. No. 07/156,413 filed Feb. 16, 1988 (abandoned).

U.S. Pat. No. 4,722,759 of Roberts et al. and U.S. Pat. No. 4,807,668 of Roberts are related to this application.

BACKGROUND OF THE INVENTION

This invention relates generally to drip irrigation tape.

The drip irrigation system consists of lengths of plastic tubing or tape placed above ground or underground near the roots of plants, the tubing having numerous small outlets at spaced intervals supplying drops of water continuously to the plants. This allows the amount of water supplied to be controlled more precisely, conserving water, improving crops and reducing salt accumulation and fertilizer loss in the soil.

In my previous U.S. Pat. Nos. 4,722,759 and 4,807,668, referred to above, a drip irrigation tape is described in which a strip of flexible material is formed with an indented groove extending lengthwise adjacent one side edge of the strip, the other side edge being folded over to overlap the first side edge and form a first or main water conduit. The overlapping side edges are sealed together on opposite sides of the groove to form a seam in which the groove defines a secondary conduit. Spaced inlets from the first conduit to the secondary conduit and outlets from the secondary conduit are provided, so that fluid supplied to the first conduit flows into the secondary conduit and from there leaks slowly out of the outlets into the surrounding soil.

A method and apparatus for fabricating such tape was described in my previous patents, which consisted of first forming the groove on a vacuum drum, then folding the strip lengthwise before sealing the overlapping edges at or close to the opposite sides of the groove by means of a heat sealing wheel.

In my previous patents the secondary conduit was formed by a straight, continuous or segmented channel. However, there is some advantage in providing a non-straight path to create some turbulence in the fluid flowing along the channel or conduit. Thus, in U.S. Pat. No. 4,473,191 of Chapin one of the embodiments shows a drip irrigation tape in which the flow restricting passage is in the form of a zig-zag or serpentine path. In this case the passage is formed by depositing a flat ribbon of plastic onto one side edge of the tape and then deforming the ribbon to form the serpentine path using a suitable molding wheel. One problem with zig-zag flow restricting passages is that small particles of soil or dirt may become trapped in the confined space of the passage, blocking flow along the passage and thus reducing or stopping the flow of water into the soil.

SUMMARY OF THE INVENTION

It is an object of the present invention to provide an improved drip irrigation tape.

According to one aspect of the present invention a drip irrigation tape is provided which comprises a strip of flexible material having a series of spaced, indented channel formations formed in one face of the strip along a first side edge portion by molding the strip while hot, each channel formation including a first channel portion extending lengthwise along the strip and a plurality of spaced, parallel inlet channels extending transversely into the first channel portion. The strip is folded lengthwise with the first side edge portion overlying a second side edge portion to form a main conduit, and the first and second side edge portions are sealed together at least along the opposite sides of the channel formations so that each channel formation defines a secondary conduit. The inlet channels connect the main conduit to the secondary conduit and at least one outlet is provided to connect each channel formation to the exterior of the structure. Each formation may be separated from the adjacent formations by means of transverse seal lines.

The first and second side edge portions are preferably sealed together by spaced seal lines on opposite sides of the channel formations. The seal lines joining the overlapping tape portions together may be spaced from the outer side edges of the channel formations so that if any dirt or sand blocks the serpentine portions, the back up pressure of water behind the blockage will force the overlapping, unconnected flat tape portions on either side of the channel to deform outwardly, tending to shift or release the blockage. This has been found to reduce such blockages substantially, leading to improved flow characteristics.

The overlapping side edge portions may be sealed together wherever they contact one another, i.e. everywhere except the indented areas of the channel formations, for example by means of heat sealing, ultrasonic welding, or by means of a thin layer of adhesive covering the regions of the second side edge portion of the tape which will lie under the overlapping first side edge portion. Alternatively, they may be sealed only along spaced seal lines extending along opposite sides of the channel formations. In the latter case, formation of the outermost seal line leaves a free flap along the outer edge of the second edge portion. It has been found that roots tend to grow along this flap between the flap and the underlying tape, leading to blockages of the outlets if they are formed by gaps in the seal line. The outlets therefore preferably comprise slits or holes pierced in the outermost wall of the secondary conduit. The strip is preferably folded with the second edge portion on the inside.

The first channel portion may be straight and a second, serpentine channel portion may extend from the first portion. Preferably, the inlets comprise parallel, indented inlet channels extending into the straight inlet portion of the channel formation. The cross-sectional area of each inlet channel is much less than that of the straight inlet portion. The serpentine portion also has a cross-sectional area less than that of the inlet portion. The inlet channels and larger, straight inlet portion act as a filter or screen to reduce the risk of debris blocking flow. Preferably, spaced inlet channels are provided along the entire length of the larger, inlet portion. Any one of the inlet channels can feed the secondary conduit, significantly reducing the risk of any plugging and blocking of flow in the secondary conduit.

In one embodiment of the invention, the straight inlet portion and serpentine portion are aligned and extend lengthwise along the first side edge portion. In an alternative embodiment, the channel formation includes at least one U-bend in which the channel direction is reversed, so that adjacent channel sections on opposite sides of the bend extend generally parallel to one another and the first side edge of the tape, but in opposite directions. Preferably, two U-bends or reverses in direction are provided. This allows the secondary conduit to be made much longer for the same drip outlet spacing, and thus allows the channel size to be made larger for the same drip rate.

BRIEF DESCRIPTION OF THE DRAWINGS

The present invention will be better understood from the following detailed description of some preferred embodiments of the invention, taken in conjunction with the accompanying drawings, in which like reference numerals refer to like parts, and in which:

FIG. 1 is a top plan view of a portion of a drip irrigation tape according to a first embodiment of the invention;

FIG. 2 is an enlarged sectional view taken on line 2—2 of FIG. 1;

FIG. 3 is a sectional view taken on line 3—3 of FIG. 2;

FIG. 4 is a sectional view taken on line 4—4 of FIG. 2;

FIG. 5 is a sectional view taken on line 5—5 of FIG. 2;

FIG. 6 is a sectional view taken on line 6—6 of FIG. 2;

FIG. 7 is a top plan view of a portion of hose showing an alternative serpentine channel;

FIG. 8 is a similar top plan view showing a further type of serpentine channel;

FIG. 9 is a top plan view of a portion of a drip irrigation tape according to a second embodiment of the invention;

FIG. 10 is an enlarged view of part of the serpentine portion of the secondary conduit of FIG. 9;

FIG. 11 is a section on the lines 11—11 of FIG. 10;

FIG. 12 is a sectional view on the lines 12—12 of FIG. 11;

FIG. 13 is a section similar to FIG. 12 illustrating an alternative method of joining the side edge portions of the tape;

FIG. 14 is a top plan view of a portion of a drip irrigation tape according to a third embodiment of the invention;

FIG. 15 is an enlarged top plan view showing a modified serpentine configuration; and FIG. 16 is a typical sectional view similar to FIG. 13, showing the overlapped portions of the strip secured together via a thin layer of sealant material.

DESCRIPTION OF THE PREFERRED EMBODIMENTS

FIGS. 1–6 of the drawings show a drip irrigation tape or hose 10 according to a preferred embodiment of the present invention. The tape 10 is formed from a strip of flexible, water impervious material such as medium or high density polyethylene, or other suitable polyolefin, suitably dimensioned for folding over with its side edges overlapping to form a primary conduit 12 for water or other fluid. A series of spaced, indented grooves or channel formations 16 are formed along one side edge 17 of the strip. The opposing side edges 17,19 are sealed together along spaced seal lines 18,20 which are spaced from the outer side edges 22 of the groove, as best seen in FIG. 1.

In the embodiment shown in FIG. 1, each channel formation includes a straight, inlet portion 23 and a serpentine portion 24 of a desired length extending along the tape. Each inlet portion 23 has a plurality of spaced, parallel inlet channels 26 extending transversely into portion 23, and a series of parallel outlet channels 28 are provided at the opposite end of the channel formation. Inclined transverse seal lines 30 separate the successive channel or groove segments 24. The inlet and outlet channels are formed by suitable indentations in the overlapping side edge of the strip, in the same way as the serpentine groove. Gaps 32,34 are provided in the seal lines 18,20, respectively in the region of inlets 26 and outlets 28, as seen in FIG. 1. The inlet channels will extend over the underlying side edge 19 of the tape, as illustrated in FIG. 5, to provide the necessary inlet opening from conduit 12.

Although separate serpentine channel segments are shown in FIG. 1, the groove or secondary conduit may alternatively be continuous, with spaced inlets and outlets provided along its length in an equivalent fashion. Instead of a plurality of parallel inlets and outlets as shown in FIG. 1, pairs of inlet channels defining a V-shape leading into the conduit may be provided, as in my U.S. Pat. No. 4,722,759 referred to above, and the outlets may be defined simply by spaced breaks in one of the seal lines. Alternatively, a single outlet may be provided in place of parallel outlets 28.

FIGS. 7 and 8 show two alternative configurations 33,35 for the serpentine portion 24 of the channel. The configuration will depend on the desired flow characteristics and also in ease of manufacture of the channel or groove. The turbulent flow resulting from the constantly changing direction will tend to keep small particles of grit and dirt moving along the channel without causing a blockage. The provision of linear seal lines spaced from the side edges of the channel has the advantage of being simple to manufacture and also of helping to shift any blockages. Thus, if the serpentine channel 16 of FIG. 1 should become blocked, for example at the location shown in FIG. 6, water will back up behind the blockage as it is flowing constantly along the main conduit and into the secondary conduit. The resultant water pressure will cause the opposing faces 25 of the side edges of the strip on opposite sides of the channel between the seal lines to deform away from one another, as generally indicated in FIG. 17. This allows a gush of water to flow along the channel, tending to shift the blockage. After the blockage has shifted, the overlapping side edges will collapse back together as shown in FIG. 6. The design of the serpentine channel with spaced seal lines thus considerably reduces the risk of blockages which would otherwise cut off water from adjacent areas of soil surrounding the tube.

By providing a large number of inlet channels all connected to a straight inlet channel portion 23 of relatively large cross-section, the risk of blockage at an inlet stopping flow through any secondary conduit segment is also reduced considerably. As long as one inlet channel remains unblocked, fluid will be supplied to the secondary conduit. Any debris small enough to enter the inlet portion 23 via an inlet channel will be too small to cause a blockage.

The drip irrigation tape of FIGS. 1–6 is preferably made in the manner described in my U.S. Pat. No. 5,375,770, the contents of which are incorporated herein by reference. A strip of polyethylene material is first extruded from an extruder and the channel formation is then formed in the first side edge portion of the strip by passing it between a shaping drum and an opposing guide drum. The shaping drum will have a series of indented channels each corresponding in shape to the shape of the desired channel formation. The indented channels are connected to a vacuum source so that the molten strip material passing over the channel will be pulled into the channel and shaped. A folding mechanism is located downstream of the shaping drum for folding the strip with its opposite side edges overlapping, followed by a heat sealing station for forming the seal lines to seal the overlapping edges together to form the separate main conduit and secondary conduit segments. After the heat sealing station, the formed tape is passed over a series of guide rollers and cooling wheels before being wound onto a storage spool.

FIGS. 9–12 illustrate a drip irrigation tape or hose 50 according to a second embodiment of the invention. The tape is formed from a strip of flexible, water-impervious material such as medium to high density polyethylene or other polyolefins, in the same manner as described above in connection with the first embodiment. A series of spaced, indented channel formations 52, one of which can be seen in FIG. 9, are formed in one side edge portion of the strip adjacent one side edge 54. The strip is then folded so that the first side edge portion overlaps a second side edge 56 of the strip to form a primary conduit and a series of secondary conduit segments.

Each channel formation 52 includes a straight, inlet portion 58 connected to a serpentine portion. The straight portion 58 extends in a first direction parallel to the side edge 54 of the strip, while the serpentine portion includes a first portion 62 extending in the opposite direction to the inlet portion 58, a U-bend 64, and a second portion 65 extending back in the opposite direction to portion 62. An outlet chamber 66 of enlarged dimensions is provided at the end of serpentine portion 65, and an outlet slit 68 is stamped or cut in the upper wall of chamber 66, as best illustrated in FIGS. 9 and 11. Thus, the channel formation 52 forming each secondary channel segment zig-zags or winds back and forth to extend the effective length of the secondary conduit while maintaining the same outlet spacing.

The channel formation 52 also includes a series of straight, parallel inlet channels 70 extending transversely into the straight, inlet portion 58 at spaced intervals along the entire length of portion 58, as illustrated in FIG. 9. The overlap between the opposite side edge portions of the strip is arranged such that the second side edge 56 lying beneath channel formation 52 will be positioned beneath the inlet channels 70, as illustrated in FIGS. 9 and 12, leaving a gap 71 at the end of each channel 70 communicating with the main conduit for flow from the main conduit into channel 70. The straight inlet portion 58 has a first end 72 and a second end 74, and the first portion 62 of the serpentine portion extends alongside portion 58 from the second end back towards the first end. The inlet portion 58 is connected to the first serpentine channel by means of a series of spaced connecting channels 75 extending from the inlet portion across to the first serpentine portion 62 adjacent the second end 74 of the straight, inlet portion, as illustrated in FIG. 9. Four connecting channels 75 are illustrated, but any number of connecting channels from one to seven or more may be provided.

The outlet spacing of the hose is fixed, depending on the irrigation requirements. This arrangement allows a large number of spaced inlets to be used without reducing the length of the serpentine or flow reducing portion of the secondary conduit.

The shape of the serpentine portions of the channel formation is illustrated in more detail in FIG. 10. The serpentine shape comprises a series of elongate chambers 76 offset alternately on opposite sides of the center line 77 of the serpentine section and interconnected by orifices 78 between adjacent ends of each pair of chambers. Flow will be in the direction of the arrow 79 in FIG. 10. Each chamber includes a generally straight inlet end 80 forming a continuation of the orifice 78, and a rounded outlet end 82 for producing a swirling, circular or vortex type of flow pattern in the water at the outlet end of the chamber. This will tend to reduce the flow rate, and will tend to produce a little more turbulence in the transition from the outlet end of one chamber to the straight inlet end of the next chamber than a corresponding chamber shape in which both ends are rounded, as was described in my U.S. Pat. No. 5,375,770 referred to above. This is because the rounded ends can be more rounded, and the offset between the chambers is greater than in the previous configuration. The orifice width is approximately equal to the width of the chambers.

As noted above, the first serpentine portion 62 extends back alongside inlet channel 58 up to the first end of the inlet portion 58. The channel then changes direction around a U-bend portion 64 which connects the first serpentine portion 62 to second serpentine portion 65, which extends back alongside portion 62 in the opposite direction, up to outlet chamber 66. The second serpentine portion is of shape identical to that of the first portion with respect to the flow direction of water through the channel.

The first and second side edge portions of the tape or strip are preferably secured together by means of spaced seal lines, as illustrated in FIG. 1. First and second spaced, parallel seal lines 84,85 extend on opposite sides of the channel formation, with gaps 86 in seal line 85 to accommodate each of the inlet channels 70. The seal lines 84 and 85 are connected together by spaced transverse seal lines 87 between each pair of channel formations. Additional seal lines 88,89 are provided between the straight inlet portion 58 and the first serpentine portion 62, and between the two serpentine portions 62 and 65, respectively, to prevent fluid flowing along the channel portions from forcing the overlying portions of the strip apart and leaking across the space between the adjacent channel portions. Seal line 88 has gaps 90 to accommodate each of the connecting channels 75. Seal line 89 extends from a location close to bend 64 up to the next transverse seal line 67. This arrangement seals off each portion of the secondary conduit from the next adjacent portion, and seals straight inlet channel portion 58 from the interior of the hose except for via the inlet channels 70. In an alternative embodiment, some of the seal line portions between inlet channels 70 may be omitted, for example alternate seal line portions between inlet channels 70 may be omitted.

The secondary channel formation 52 as illustrated in FIGS. 9–12 has the advantage that the dimensions of both the inlet channels and the serpentine channel portions can be made larger than in conventional secondary conduits while maintaining the same flow rate. The spacing between the outlets 68 of successive channel configurations 52 will be dependent on the irrigation requirements, and in practice tape 50 will be made with outlet spacings of 4", 8", 12" and multiples thereof. The serpentine or tortuous portion of the secondary conduit is made longer than the outlet spacing by winding it back and forth in a zig-zag or doubled back pattern having at least one U-bend 64. With this arrangement, the straight inlet channel portion is preferably approximately 1.25 to 1.50 times wider than the rest of the channels. The inlet channels 70 may be of width approximately the same as the serpentine channel portions to 20% less than the width of the serpentine channel portions. The serpentine channel preferably has a width of 0.030–0.100", and all of the channel portions preferably have approximately the same depth, in the range 0.015–0.035" deep. The channel width and depth may be designed for the desired flow rate, with the channel being made shallower in depth as it is widened, in order to maintain a desired flow rate. Generally, a wider channel is better as it permits more deflection of the channel wall for pressure compensation.

The depth of outlet channel 66 may be the same as or slightly greater than that of the remainder of the channel formation.

The multiple inlet channels 70 to a larger inlet portion 58 have a screen effect to remove debris from the water entering inlet portion 58. Any debris small enough to enter portion 58 will be too small to cause any blockage of channel portion 58 or serpentine portions 62,65, which are of a width equal to or greater than that of channels 70. As long as at least one inlet channel 70 is unblocked, this will be sufficient to feed the secondary conduit and provide the desired drip rate at outlet slit 68. The provision of four connecting channels 75 from the straight inlet portion 58 to the serpentine portion 62 further reduces the risk of any blockage stopping flow along the secondary conduit. Channels 75 will be of approximately the same dimensions as inlet channels 70. If any one, two or three of channels 75 should become blocked, the remaining channels or channel will still provide a sufficient supply to the serpentine flow portions of the conduit.

Although the width of the serpentine channel portions is relatively large, the winding nature of the path, along with the rounded ends of chambers 76 introducing some turbulence in the flow pattern, will tend to reduce the flow rate so that the same drip rate is produced as for a corresponding straight conduit of smaller dimensions. The turbulent flow conditions will also tend to dislodge any small debris which manages to flow into the serpentine portions. The arrangement allows multiple spaced inlets to be used without reducing the length of the serpentine or turbulent flow portion of the secondary conduit, unlike prior arrangements.

The tape or hose 50 of FIGS. 9–12 is preferably also formed by basically the same method as described in my U.S. Pat. No. 5,246,171 referred to above, with appropriate modification of the shaping drum channels to correspond to the shape of channel configuration 52 of FIG. 9, and modification of the heat sealing drum to provide ribs for forming the heat seal lines 85,86,87,88 and 89. Outlet slit 68 may be laser cut. Alternatively, the strip may be passed under a roller with a retractable blade which is suitably timed for punching successive slit outlets 68 in the strip.

FIGS. 13 and 16 illustrate an alternative method for making tape with the secondary conduit configuration of FIGS. 9–12, or that of FIGS. 1–8. In this method, the various seal lines are eliminated and the overlapping side edge portions of the strip are secured together via a thin layer 91 of adhesive laid down on the flat side edge portion of the strip. Layer 91 comprises a continuous band or ribbon of adhesive or sealant material deposited on the flat side edge portion of the strip so that one side edge 110 of the band is aligned with the outer side edge 56 of the strip. The opposite side edge 112 of the band is located at a position on the flat side edge portion which will be substantially aligned with the side edge 54 of the overlapping side edge portion. Thus, the band has a width substantially equal to the spacing between the outer side edges 54,56 of the overlapping strip portions when adhered together, and will bond together the entire overlapping surface areas apart from the indented conduit regions. The conduit configuration 52 may be vacuum formed on a shaping drum in a similar manner to that described above. While maintaining the strip material in a super-heated state, a film or layer 91 of adhesive is laid down so that it completely covers the regions of the flat side edge portion which will underlie the channel configuration in the opposite side edge portion. In other words, the width of layer 91 will be greater than that of the channel configuration 52. The film layer will be very thin, of the order of only 0.75 mil. thick. After the adhesive film is laid down, the opposite side edge is folded over as illustrated in FIG. 13, and pushed down over the strip so that the two side edges are adhesively sealed together, as illustrated in FIG. 16. With this arrangement, all regions of the overlapping side edge portions outside the indented channel formation will be sealed together.

FIG. 14 illustrates an alternative, indented channel configuration 92 for forming the secondary conduit which is similar to that of FIGS. 9–12 except that the straight inlet portion 58 is eliminated. The configuration 92 is preferably formed by the same method as in the previous embodiment, and has a first serpentine portion 93 having a plurality of spaced, parallel inlets 94 and extending in a first direction from inlets 94 up to U-bend 95. A second serpentine portion 96 extends from U-bend 95 in the opposite direction to the first portion 93 back past the inlets to an outlet chamber 97 having a slit outlet 98 as in the previous embodiment. The shape of the serpentine portions 93 and 96 is substantially the same as that of the previous embodiment, and includes offset chambers on opposite sides of the center line of the serpentine channel, each chamber having an inlet end with a flat end wall and an outlet end with a rounded end wall for introducing turbulence into the water flowing along the channel. Water will be directed in a circular path around the rounded end wall in the opposite direction to water flowing along the chamber, producing turbulence and retarding flow. This will tend to reduce the flow rate and allows the cross-section of the channel to be larger than that for an equivalent straight channel for the same flow rate.

Spaced parallel seal lines 100,102,104 are provided between the first serpentine portion 93 and the inlet ends of inlet channels 94, between the two serpentine portions 93 and 96, and between the second serpentine portion and the outer side edge 54 of the strip. Transverse seal lines 106 extend between the outermost seal lines in the space between each adjacent pair of channel configurations 92. One or two of the seal line portions between inlets 94 may be omitted in alternative arrangements. This will permit some expansion to clear blockages.

As in the previous embodiments, the width of each inlet channel is approximately equal to that of the serpentine channel portions, reducing the risk of blockage at the inlets. The irrigation hose as illustrated in FIG. 14 may also alternatively be made by the method illustrated in FIG. 13, eliminating the need for seal lines 100,102,104 and 106.

In the embodiment of FIG. 9–12 or that of FIG. 14, the dimensions of the serpentine channel portions may be as follows. The width of the straight portion of each chamber may be in the range of 0.030" to 0.100", while the width of each orifice connecting the adjacent chamber ends is about 0.050". The radius of the rounded end wall is in the range from 0.020" to 0.040". The length of each chamber from the center of the inlet orifice to the center of the outlet orifice is around 0.135". This arrangement will introduce sufficient turbulence to slow down the rate of flow through the serpentine portions and produce a desired outlet drip rate.

FIG. 15 is an enlarged view similar to FIG. 10 illustrated a modified configuration for the serpentine portions in either FIG. 9 or FIG. 14. In this version, the offset between the chambers 176 on opposite sides of center line 177 is increased, and the connecting orifices 178 are narrower in width than chambers 176. As in the previous embodiment, chambers 176 have a flat inlet end wall 180 and rounded outlet end 182.

Although some preferred embodiments of the invention have been described above by way of example only, it will be understood by those skilled in the field that modifications may be made to the disclosed embodiments without departing from the scope of the invention, which is defined by the appended claims.

I claim:

1. A drip irrigation tape, comprising:
a strip of flexible material having opposite first and second side edges and first and second side edge portions extending alongside the respective side edges, at least one indented channel formation formed in the first side edge portion of the strip, the indented channel formation comprising a groove deformed out of the plane of the remainder of the strip, the groove including at least a first channel portion extending lengthwise along at least part of the strip and a plurality of separate inlets extending into the first channel portion at spaced intervals;

the strip being folded with its first side edge overlapping its second side edge;

the overlapping opposite side edge portions of the strip being sealed together on opposite sides of said channel formation to form a main conduit within the folded strip and at least one secondary conduit along the indented channel formation;

the secondary conduit having at least one outlet spaced from said inlets and connecting the secondary conduit to the exterior of the tape; and said first channel portion being straight and extending in a first direction from said inlets, and said indented formation including a second channel portion of serpentine shape extending lengthwise along the strip from said first channel portion, said outlet being located in said second channel portion.

2. The tape as claimed in claim 1, wherein said second serpentine channel portion extends in the opposite direction to said first straight channel portion and said channel formation includes at least one connecting channel connecting said first channel portion to said second channel portion.

3. The tape as claimed in claim 2, wherein said indented formation includes a third channel portion of serpentine shape matching that of said second channel portion and extending in the opposite direction to said second channel portion, and a U-bend portion connection said second channel portion to said third channel portion.

4. The tape as claimed in claim 2, including at least two transverse connecting channels connecting said first channel portion to said second channel portion.

5. The tape as claimed in claim 1, wherein said serpentine shape has a center line and comprises a series of chambers offset alternately on opposite sides of said center line, each chamber having an inlet end and an outlet end, a series of connecting orifices between the chambers, each orifice connecting the outlet end of one chamber on one side of the center line to the inlet end of the adjacent chamber on the opposite side of the center line, and each chamber having a substantially flat end wall at said inlet end and a rounded end wall at said outlet end.

6. The tape as claimed in claim 1, wherein the width of said straight portion is greater than that of said inlets and said second channel portion.

7. The tape as claimed in claim 6, wherein the width of said straight portion is 1.25 to 1.50 times greater than the width of said inlets and the width of said second channel portion.

8. The tape as claimed in claim 1, wherein the width of said inlets is in the range from 20% less than the width of said second channel portion to equal to the width of said second channel portion.

9. The tape as claimed in claim 8, wherein the width of said second channel portion is in the range from 0.030" to 0.100".

10. The tape as claimed in claim 1, wherein said first channel portion has a width greater than that of said inlets.

11. The tape as claimed in claim 1, wherein said inlets comprise inlet channels at spaced intervals along the entire length of said straight portion.

12. A drip irrigation tape, comprising:
a strip of flexible material having opposite first and second side edges and first and second side edge portions extending alongside the respective side edges, at least one indented channel formation formed in the first side edge portion of the strip, the indented channel formation comprising a groove deformed out of the plane of the remainder of the strip, the groove including at least a first channel portion extending lengthwise along at least part of the strip and a plurality of spaced inlet channels extending into the first channel portion;

the strip being folded with its first side edge overlapping its second side edge so that the second side edge portion extends over said first channel portion and part of said inlet channels to leave a gap connecting each inlet channel to the interior of the folded strip;

the overlapping opposite side edge portions of the strip being sealed together on opposite sides of said channel formation to form a main conduit within the folded strip and at least one secondary conduit along the indented channel formation;

the secondary conduit having at least one outlet spaced from said inlet channels and connecting the secondary conduit to the exterior of the tape;

said first channel portion being straight and extending in a first direction from said inlet channels;

said indented formation including a second channel portion of serpentine shape extending lengthwise along the strip from said first channel portion in the opposite direction to said first channel portion; and the opposite side edge portions of the strip being sealed together by at least three spaced, parallel seal lines extending lengthwise along the strip, the seal lines comprising a first seal line extending in the space between the first straight portion and second side edge of the underlying side edge portion of the strip, and having spaced gaps, each inlet channel extending through a respective one of said gaps, a second seal line extending in the space between said first and second channel portions, and a third seal line extending on the opposite side of said second channel portion.

13. The tape as claimed in claim 12, including a series of spaced, identical indented channel formations and a gap between each adjacent pair of channel formations, and a series of transverse seal lines extending between said first and second seal lines in the gaps between adjacent channel formations.

14. A drip irrigation tape comprising:
a strip of flexible material having opposite side edges and a series of spaced, indented channel formations in one side edge at spaced intervals along the length of the strip, each channel formation comprising a deformed portion of strip material deformed out of alignment with the remainder of the strip, the strip being folded lengthwise with its opposite side edges overlapping and the channel formations outermost;

the opposite side edges being secured together along opposite sides of said indented channel formations to form a main conduit within the folded strip and a series of spaced secondary conduits along said channel formations;

each channel formation having an inlet end and an outlet end at opposite ends of the channel formation, and including a first channel portion extending lengthwise along the strip from said inlet end and a series of spaced inlets extending into said first channel portion and a second channel portion extending from said first channel portion;

each secondary conduit having at least one outlet at the outlet end of said channel formation connecting the secondary conduit to the exterior of the strip; and said first channel portion extending in a first direction from said inlet end and said second channel portion extending back in the opposite direction to said first channel portion alongside said first channel portion.

15. The tape as claimed in claim 14, wherein said inlets each comprise an indented inlet channel in said channel formation, the width of said first channel portion being greater than the width of said inlet channels.

16. The tape as claimed in claim 15, wherein the width of said first channel portion is 1.25 to 1.50 times greater than the width of said inlet channels.

17. The tape as claimed in claim 16, wherein the width of each inlet channel is in the range from 0.020" to 0.050".

18. The tape as claimed in claim 14, wherein the width of said first channel portion is greater than that of said second channel portion.

19. The tape as claimed in claim 15, wherein each inlet channel has an inlet end overlapping the underlying side edge of the innermost side edge portion of the strip to provide an inlet opening communicating with said main conduit.

20. The tape as claimed in claim 14, wherein said second channel portion has an outlet end and said channel formation includes a third channel portion of serpentine shape connected to the outlet end of said second channel portion and extending in the opposite direction to said second channel portion in a direction towards the outlet end of said first channel portion.

21. The tape as claimed in claim 14, wherein the opposite side edge portions of the tape are sealed together by means of at least two spaced seal lines extending on opposite sides of said channel formations.

22. The tape as claimed in claim 14, wherein the first and second channel portions are both of serpentine shape.

23. The tape as claimed in claim 22, wherein said serpentine shape has a center line and comprises a series of chambers offset alternately on opposite sides of said center line, each chamber having an inlet end and an outlet end, a series of connecting orifices between the chambers, each orifice connecting the outlet end of one chamber on one side of the center line to the inlet end of the adjacent chamber on the opposite side of the center line, and each chamber having a substantially flat end wall at said inlet end and a rounded end wall at said outlet end.

24. The tape as claimed in claim 23, wherein said serpentine shape extends from said inlet end to said outlet end of said channel formation.

25. The tape as claimed in claim 22, wherein the inlets comprise a series of spaced, parallel channels extending transversely into said first channel portion.

26. A drip irrigation tape, comprising:

a strip of flexible material having opposite side edges and a series of spaced, indented channel formations in one side edge at spaced intervals along the length of the strip, each channel formation comprising a deformed portion of strip material deformed out of alignment with the remainder of the strip, the strip being folded lengthwise with its opposite side edges overlapping and the channel formations outermost;

the overlapping side edges of the strip being secured together to form a main conduit within the folded strip and a series of spaced secondary conduits along said channel formations;

each channel formation having an inlet end and an outlet end at opposite ends of the channel formation, and including a first channel portion extending lengthwise along the strip from said inlet end and at least one inlet extending into said first channel portion and a second channel portion extending from said first channel portion;

each secondary conduit having at least one outlet at the outlet end of said channel formation connecting the secondary conduit to the exterior of the strip; and a continuous layer of sealant material between the innermost side edge portion of the strip and the outermost side edge portion of the strip underlying said channel formation, the layer of sealant material having a width greater than that of said channel formation and bonding said side edge portions together in all overlapping regions outside said indented channel formation.

27. A drip irrigation tape, comprising:

a strip of flexible material having opposite side edges and a series of spaced, indented channel formations in one side edge at spaced intervals along the length of the strip, each channel formation comprising a deformed portion of strip material deformed out of alignment with the remainder of the strip, the strip being folded lengthwise with its opposite side edges overlapping and the channel formations outermost;

the opposite side edges being secured together along opposite sides of said indented channel formations to form a main conduit within the folded strip and a series of spaced secondary conduits along said channel formations;

each channel formation having an inlet end and an outlet end at opposite ends of the channel formation, and including a first channel portion extending lengthwise along the strip from said inlet end and a series of spaced inlets extending into said first channel portion and a second channel portion extending from said first channel portion;

each secondary conduit having at least one outlet at the outlet end of said channel formation connecting the secondary conduit to the exterior of the strip;

said first channel portion extending in a first direction from said inlet end and said second channel portion extending back in the opposite direction to said first channel portion alongside said first channel portion; and the opposite side edge portions of the tape being sealed together by means of at least three spaced, parallel seal lines, the seal lines comprising a first seal line extending between the first channel portion and the second side edge of the strip, a second seal line extending in the space between said first and second channel portions, and a third seal line extending on the opposite side of said second channel portion.

* * * * *